INVENTOR.
FRANCIS A. d'ARTENAY

March 25, 1952  F. A. D'ARTENAY  2,590,158
HITCH FOR GANGING A PLURALITY OF IMPLEMENTS
IN SQUADRON ARRANGEMENT
Filed Sept. 13, 1949  2 SHEETS—SHEET 2

INVENTOR.
FRANCIS A. d'ARTENAY
BY Huebner, Beehler,
Worrel, Herzig & Caldwell
ATTORNEYS Patented Mar. 25, 1952

2,590,158

UNITED STATES PATENT OFFICE 2,590,158

HITCH FOR GANGING A PLURALITY OF IMPLEMENTS IN SQUADRON ARRANGEMENT

Francis A. D'Artenay, Stratford, Calif.

Application September 13, 1949, Serial No. 115,364

5 Claims. (Cl. 97—77)

The present invention relates generally to hitches and more particularly to a draft coupling for connecting a plurality of agricultural implements in squadron or gang relation to a tractor or other prime mover and for maintaining the implements in cooperative association while imparting earth traversing movement thereto.

This application for Letters Patent is a continuation in part of the applicant's co-pending application relating to a Hitch for Ganging a Plurality of Implements in Squadron Arrangement filed November 17, 1948, Serial No. 60,528 and issued May 15, 1951 as Patent No. 2,552,770. In the said application, a hitch is shown and described for connecting a plurality of disc plows, or other earth working tools pivotally together in echelon arrangement and effecting draft connection thereof to a tractor by means of flexible cables secured to a draft plate mounted on the tractor.

The original hitch proved thoroughly effective in ganging the tools for operation, and it was found that in drawing the tools in a relatively straight, or only slightly curved line, the tools maintained their precise cooperative positions and fully accomplished the intended purposes of the hitch. In turning, however, it has been further found that certain difficulties developed frequently resulting in damage to one or more of the tools in the squadron. In turning to the left, with disc plows that plowed to the right, the lead plow was difficult to displace from echelon alignment with the other plows to initiate the turning operation. Thus in turning a tractor to the left while pulling disc plows, such severe strains were imposed upon the hitch and the lead plow preliminary to displacement thereof from echelon alignment, that frequent damage occurred thereto. In turning to the right, the lead disc plow frequently failed to lag because of operation of the booms and dug in to such an extent that such turns were impossible in many types of soil.

An object of the present invention is to provide a hitch of the type described in my above identified co-pending application which in addition to the attributes thereof is suited to turning operations and which is characterized by the ready displacement of the lead plow, or other tool, from echelon alignment as turning operations are initiated.

Another object is to provide a hitch for ganging a plurality of implements in echelon arrangement suited to the establishment of connection of such implements to a draft appliance and providing a specialized guiding effect on the leading one of such implements.

Another object is to provide a hitch for ganging a plurality of implements in squadron arrangement which accurately maintains the implements in predetermined operable relation during earth traversing movement and yet possesses sufficient flexibility to accommodate varied soil conditions and elevations.

Another object is to provide, in a tractor hitch adapted to draw a plurality of implements in echelon arrangement, means automatically displacing the implements from such arrangement for turning purposes.

Still further objects and advantages of the invention will become apparent in the subsequent description in the specification.

Figure 1:
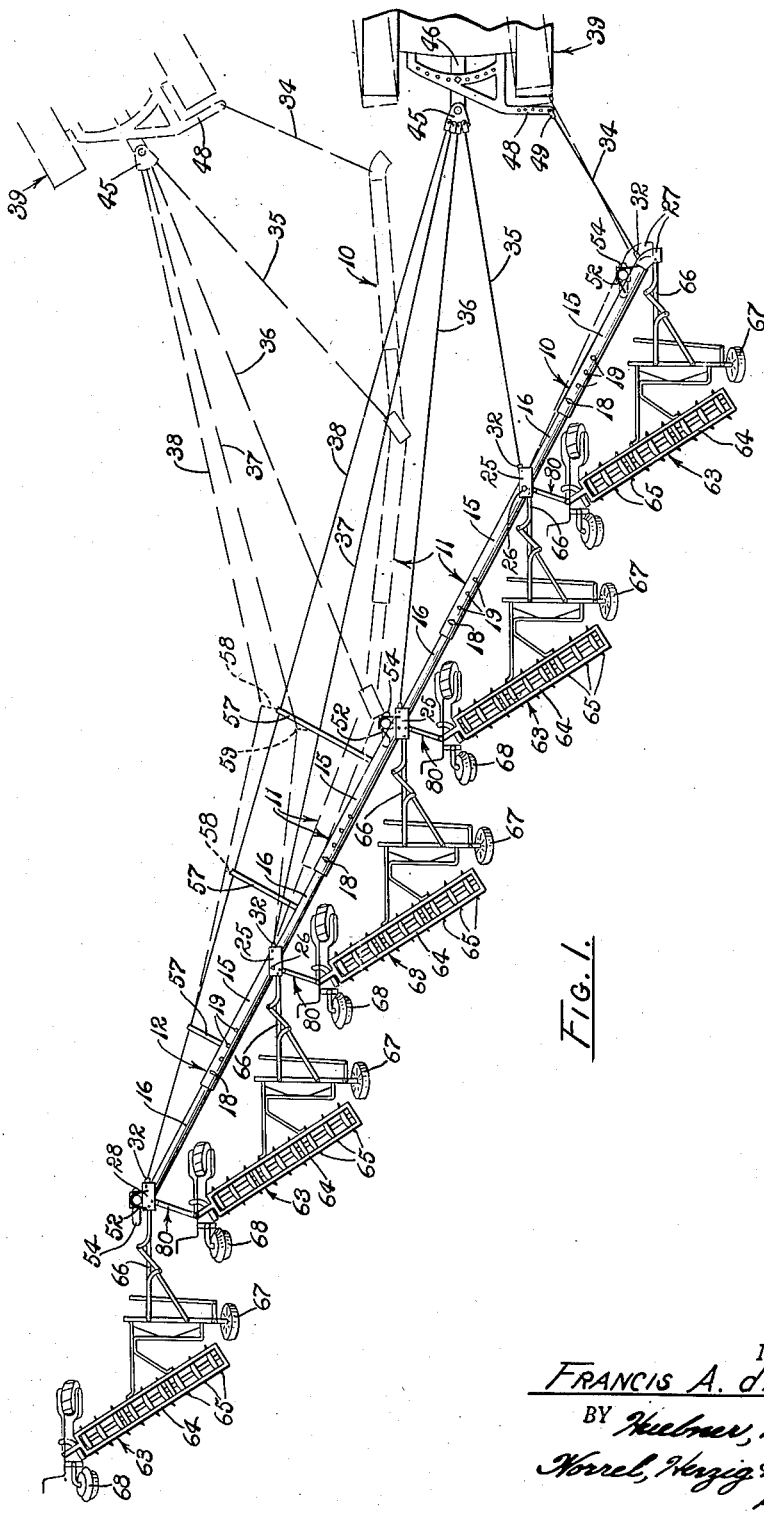
Fig. 1 is a plan view of the hitch of the present invention demonstrating the attachment of a plurality of disc plows in echelon arrangement to a fragmentarily shown tractor with two progressive positions of the hitch in accomplishing a left turn being shown in dash lines.

Referring in greater detail to the drawings:

The hitch construction includes a plurality of elongated rigid beams including a forward beam 10, a plurality of intermediate beams 11, and a rearward beam 12. Each of the beams is telescopically adjustable by providing each with a tubular member 15 into which a smaller tube 16 extends in slideable association. Each of the smaller tubes 16 is maintained in longitudinally adjusted position relative to its respective tubular member 15 individually to regulate the length of each of the beams 10, 11, and 12 by the insertion of a pin 18 through registered openings 19 of a plurality of openings formed through said portions of the beam. By locating the pins 18 in various registering openings in each of the beams, the beams may be extended longitudinally so as to accommodate various sizes and types of earth working implements. The means for adjusting the length of each of the beams is only one of many constructions that may be utilized for obtaining this objective.

During the use of the hitch of the present invention in drawing a plurality of implements in squadron connection by means of a prime mover, the plurality of beams are adapted to be located substantially in axial alignment and at an angle relative to the direction of movement of the tractor and drawn implements. The plurality of beams are pivotally interconnected at their adjacent ends by securing a pair of horizontally positioned vertically spaced plates 25 against the upper and lower sides of each of the smaller tubes 16 at the rearward end of each of the forward and intermediate beams 10 and 11. The forward end of the tubular member 15, of each of the intermediate beams 11 and the rear beam 12, is located between the spaced plates 25 and a pivot bolt 26 is placed downwardly through openings in the plates 25 and the tubular member 15 so that the beams are pivotally connected for relative horizontal pivoting on vertical axes. A pair of vertically spaced plates 27 are attached horizontally to the forward end of the tubular member 15 of the forward beam 10 and extend forwardly and laterally therefrom for connection of an earth working implement thereto. Another pair of plates 28 are secured against the upper and lower sides, respectively, of the smaller tube 16 of the rear beam 12 and extend rearwardly and horizontally therefrom in vertical spaced relationship for the attachment of an implement thereto.

The plurality of beams 10, 11 and 12 are moved in a direction angularly related to their axial alignment by providing a plurality of clevises 32, individually pivotally connected, as at 33, between forward corners of each of the spaced plates 25, 28, and 27, respectively, at both ends of each of the beams. A plurality of cables individually designated at 34, 35, 36, 37, and 38, of different lengths as will be more fully apparent, are individually attached to the clevises 32. The forward cable 34 is the shortest and the cable 38 is the longest with the cables 35, 36, and 37 of proportionate intermediate lengths therebetween and are convergently extended toward a tractor or other draft appliance indicated fragmentarily at 39. The plurality of cables each have a clevis 43 attached to their forward ends which are in turn pivotally connected at 44 to the rear edges of an arcuate draft plate 45. Forward movement is imparted to the draft plate, the cables, and the beams connected thereto by connecting the draft plate 45 pivotally to a drawbar 46 of the tractor or other prime mover 39.

An offset guide arm 48 is rigidly mounted on the tractor or prime mover for the attachment of the forward end of the forward beam 10 thereto. The guide arm conveniently takes the form of a mounting portion securely bolted to the frame of the tractor or other rigid member thereof, such as a fixed draft hitch, a laterally extended portion, and a brace between the mounting portion and the laterally extended portion, if desired. The essential purpose of the arm is that it provides rigid means laterally offset from the connection of the cables 35, 36, 37, and 38 for the connection of the leading cable 34. The cable 34 is provided with a clevis 49 at its forward end which is pivotally connected to one of a plurality of openings 50 formed through the offset arm 48. The offset arm 48 is directed laterally toward the side of the tractor or other prime mover toward which the aligned beams are directed so that on tuning movement of the tractor the arm has an exaggerated loosening or tightening effect on the leading cable, as compared with the other cables, dependent upon whether the turn is to the right or to the left, respectively. The turning movement of the offset arm, being an appreciably greater distance laterally of the tractor than the connection of the remainder of the cables to the tractor causes this exaggerated or relatively more pronounced turning of the forward beam in making turns with the tractor and facilitates displacing of the forward beam 10 from its normally aligned position with the other beams.

The plurality of interconnected beams are supported in elevated position above the ground to be tilled by the earth working implements by securing a plurality of brackets 52 to the beams. In the illustrated form, one of these brackets 52 is attached to the forward end of the forward beam 10, one to the rearward end of the rearward beam 12, and one is attached adjacent to the juncture of the intermediate beams 11. Each of the brackets is in the form of a length of strap metal bent to substantially U shape and the terminal ends thereof secured to the beams with the vertex of each bracket located forwardly and spaced from its respective beam. A caster bearing 53 is journaled within the vertex of each of the brackets 52 and rotatably receives a swivel caster wheel 54 at the lower end thereof. The swivel casters are each rotatably mounted for rolling movement over the earth and pivotally mounted on a vertical axis for trailing or caster movement so that each of the caster wheels automatically aligns itself with the direction of movement of the beams supported thereby.

In making left hand turns with the present hitch the longer cables 37 and 38 tend to become slackened relative to the forward cables and to "cut the corner." Provision is made for supporting the slackened cables so that they will not become entangled with the beams or the implements drawn thereby. The means for supporting the cables comprises a plurality of booms 57 secured to and extended horizontally forwardly at substantially right angles to the axis of the beams. A chain or chains 58 are secured to the booms 57 and depend therefrom with a ring 59 secured to the lower terminal end of each of the chains. Cables 37 and 38 are each threaded through the rings so that when the cables are slackened they will be supported in their slackened condition in the rings elevationally supported on their respective chains 58 secured to the booms 57. If necessary, or required, the cables 36 and 35 may be similarly supported but it has been found from practice that these intermediate cables do not slacken sufficiently to require such support.

The hitch of the present invention is adapted to motivate a plurality of soil working implements in echelon arrangement typified by a plurality of disc plows 63, as illustrated in Fig. 1 of the drawings. As more clearly shown in Fig. 2 of the drawings, each of the disc plows is conventionally provided with a draft frame 64 mounting a plurality of plow discs 65 below the draft frame for soil engagement. Such disc plows are conventionally provided with a forwardly extending draft tongue 66 whereby it may be drawn forwardly, a forward guide wheel 67 at the forward right end of the frame 64, and a rearward coulter disc 68 at the rearward left corner of the frame 64. The disc plows 63 are shown as exemplifying one type of implement that may be used in connection with the hitch of the present invention, other types and designs of soil working implements being adaptable to be drawn with the draft appliance. The disc plows 63 are located in echelon arrangement individually rearwardly adjacent to the substantially aligned beams 10, 11, and 12 with each of the disc plows attached to their respective beams for forward movement by pivotally connecting the forward end of each of the draft tongues 66 between respective spaced plates 25, 26, and 27 by means of a bolt 69 passed downwardly through openings in the spaced plates and through an opening in the forward end of each of the draft tongues.

With the disc plows 63 connected to the beams only at their forward ends by means of their draft tongues connected to the spaced plates, the disc plows have a tendency to drift transversely relative to each other and relative to the direction of movement so that the tilling of the soil is either unduly overlapped or spaces are left between the ends of the disc plows untouched by the soil working implements. In order to resist this lateral drifting of the disc plows relative to each other the rearward end of each of the plows, except the rearmost plow is maintained in spaced relationship to an adjacent portion of the beam to which it is connected at its forward end by the provision of guide means 80 secured and extended between the rear inner end of each of the disc plows and its respective beam.

Each of the guide means 80 extending between the rear end of each of the disc plows, except the rearmost plow, and its respective beam to which it is attached at its forward end comprises a tubular bearing 81 which is attached to the rear inner end of the draft frame 64 of each of the disc plows in a vertical position by means of a strap yoke 82 extending around the upper end of the bearing and secured to the end of the draft frame by means of bolts 83 passed through the strap yoke and the draft frame. A shaft 86 extends rotatably through each of the tubular bearings 81 with a lower thrust collar 87 secured to the lower end of the shaft 86 and abutting the lower end of the tubular bearing and another thrust collar 88 secured to the upper end of the shaft 86 and rotatably supported on the upper end of the tubular bearing 81.

A hollow tube 93 is secured to, and extends horizontally outwardly from, the lower thrust collar 87. The outer end of the hollow tube 93 is rigidly supported in its horizontal attitude relative to the shaft 86 as by securing a strut 95 between the upper thrust collar 88 and the outer end of the hollow tube 93. The complete triangle thus formed by the shaft 86, hollow tube 93, and the strut 95 maintains the hollow tube rigidly in horizontal position. A rod 96 is slideably extended into the outer end of each hollow tube 93 and the outer end thereof pivotally connected between the spaced plates 25 or 26 by means of a bolt 97 passed downwardly through openings in the plates and in the rod 96. The rod is telescopically adjustable in its respective hollow tube 93 so that the rear inner end of each of the disc plows 63 may be located relative to the rear end of its respective beam. A plurality of vertically extending openings 98 are formed through each of the hollow tubes 93 and a single opening 99 is formed vertically through each of the rods 96. A pin 100 is inserted downwardly through registered openings 98 and 99 to maintain the rods 96 in telescopic adjustment relative to their respective hollow tubes 93.

With each of the disc plows 63 pivotally connected at its forward end to the forward end of one of the beams, and by employing the guide means 80 extending between the rear inner end of each of the disc plows and the rear end of their respective beams, the disc plows are prevented from wandering transversely of the direction of movement of the squadron of plows so that there is no undue overlapping of the tilling of the soil nor is there transverse gaps or spaces between adjacent plows whereby strips of land are left untilled by the implements.

*Operation*

The operation and utility of the present invention is believed to be apparent from the foregoing description and is briefly summarized at this point. In employing the hitch as shown and described the plurality of cables 35, 36, 37, and 38 are connected to the draft plate 45 on the tractor and the forwardmost and shortest cable 34 connected to the guide arm 47 at its forward end. The length of the cables are such that the beams 10, 11, and 12 are in substantial alignment at an angle to the direction of movement imparted thereto by the tractor during straight line operation.

The disc plows 63, being attached adjacent to each end of their respective beams 10, 11, and 12, trail rearwardly from the beams in echelon arrangement. Side drift of the disc plows relative to each other transversely of the direction of movement of the squadron of plows is precluded in the provision of the guide means 80. Each of the guide means is longitudinally adjustable so that the relative transverse positioning of adjacent disc plows may be regulated. Each of the disc plows is adjusted to the proper angularity to obtain the depth of soil penetration desired so that a continuous wide swath of soil is tilled by the squadron of disc plows while they are drawn over the soil. While the disc plows are drawn forwardly during the tilling operation the interconnected beams 10, 11, and 12 are supported in spaced relation above the soil by means of the self-aligning swivel casters 54 attached to the beams in supporting relation thereto.

As shown in dashed line in Fig. 1, when the tractor 39 is turned to the left, the forward cable 34 is accelerated forwardly by the movement of the guide arm 48. This pivots the beam 10 relative to the rearwardly adjacent beam 11 and initiates a displacement of the beams from alignment. This initial pivoting of the beam 10 in the direction of the turn draws its respective plow 63 from echelon position successfully avoiding excessive strains thereon during the turning operation. As the turn is continued successive rearward beams are angled from their original aligned position in the direction of movement of the forward beam and the turn readily accomplished.

Figure 2:
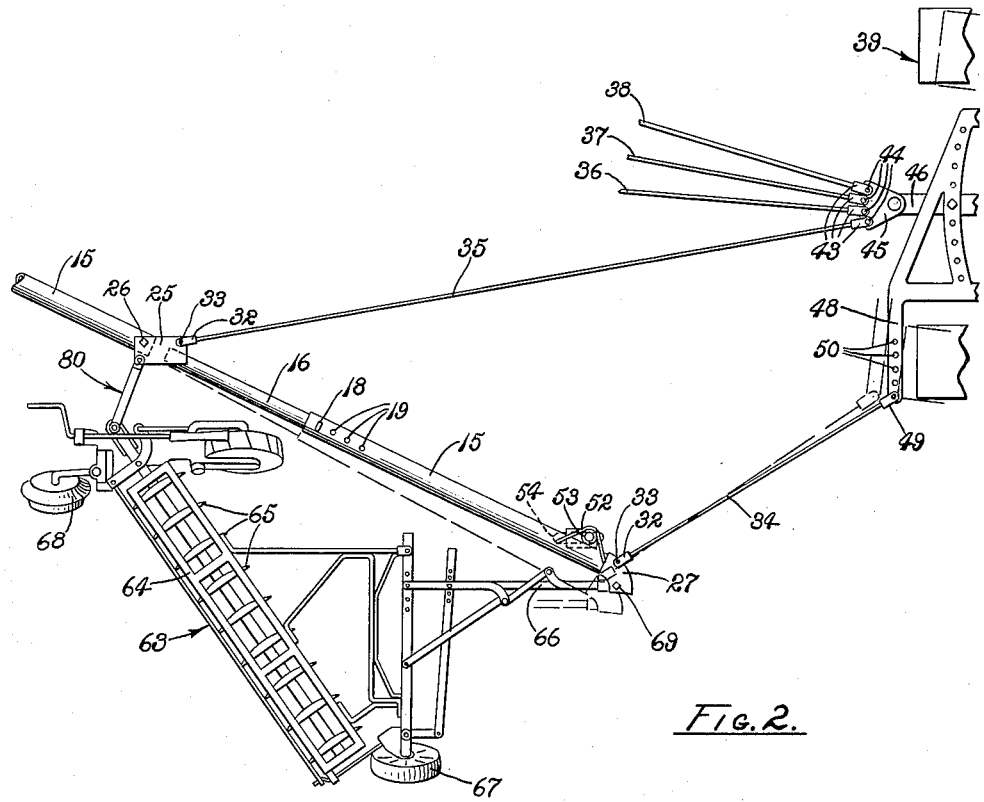
Fig. 2 is a fragmentary enlarged plan view showing a significant feature of the hitch in association with the lead plow and demonstrating in dash lines the initiation of a right hand turn.
Figure 3:
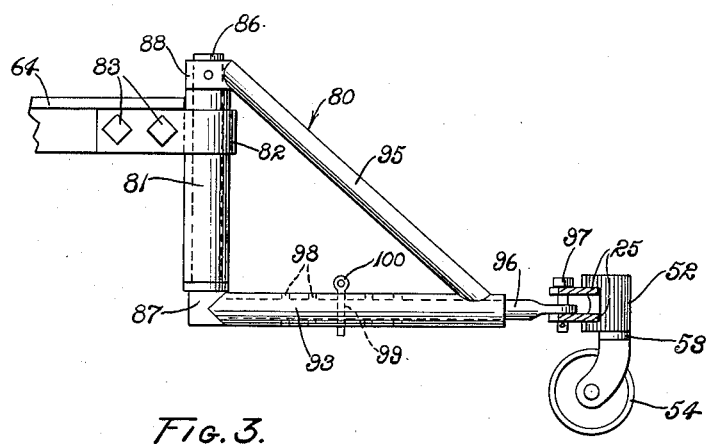
Fig. 3 is a fragmentary elevational view of a means of attaching the rearward portion of each plow to its respective beam.

In turning to the right, as shown in dashed lines in Fig. 2, the turning of the tractor causes the guide arm 48 to move rearwardly relative to the connection of the cables 35, 36, 37, and 38 appreciably slackening the cable 34. Slackening of the cable 34 while the remaining cables are taut causes the forward end of the beam 10 and its respective plow 63 to pivot rearwardly to the right. This rearward pivotal movement displaces the beam 10 from alignment with the remaining beams and makes possible the traversing of a right hand turn with a minimum of "digging in" of the plows thus successfully obviating structural failures incident to excessive strains caused by turning and permits the completion of a right turn without substantial increased drag on the tractor 39.

The structure shown in the applicant's co-pending application identified above made possible the employment of a plurality of disc plows, and other implements, in tilling a wide swath of land with dependable control as to the relative positioning of the plows so that uniformity of tillage is accomplished. The improvement described in this application, achieving the positive displacement of the beam 10 from alignment with the other beams in the initiation of turning operations, makes possible the traversing of both right and left hand turns without the imposition of undue stresses and strains on the plows or other implements and the maintenance of the plows in desired operable association during such turns.

Although I have herein shown and described my invention in what I have conceived to be the most practical and preferred embodiment, it is recognized that departures may be made therefrom within the scope of my invention, which is not to be limited to the details disclosed herein, but is to be accorded the full scope of the claims so as to embrace any and all equivalent devices and structures.

Having described my invention, what I claim as new and desire to secure by Letters Patent is:

1. A hitch for interconnecting a plurality of implements in a squadron of echelon arrangement and for connecting the squadron to a draft appliance comprising a plurality of endwardly aligned beams pivotally connected for relative horizontal movement, means pivotally interconnecting the implements of the squadron individually to the beams, cables interconnecting the rearward end portion of each beam and a common connecting position on a draft appliance, said cables being of graduated length whereby the beams are aligned angularly to a line of draft upon forward movement of the draft appliance, and a cable connected to the forward end portion of the forwardmost beam and to the draft appliance at a position laterally displaced from the connection of the other cables to said draft appliance to the side thereof toward which the aligned beams are directed.

2. A steering hitch for interconnecting a plurality of forwardly movable implements in squadron arrangement and for connecting said squadron to a draft appliance comprising a plurality of beams pivotally interconnected in substantial longitudinal alignment, a flexible tension member connected to corresponding ends of each of the aligned beams and to the draft appliance, said flexible tension members being of graduated length whereby the beams are angularly disposed to the line of draft with the ends opposite to their respective flexible tension members in leading relation to the ends connected to said flexible tension members, a bracket laterally extended from the draft appliance to the side thereof toward which the aligned beams are forwardly directed, and a flexible tension guide interconnecting the laterally extended beam and forward end of the forwardmost of the beams.

3. A hitch for interconnecting a plurality of forwardly movable implements in squadron arrangement and for connecting said squadron to a draft appliance comprising a plurality of substantially aligned articulately connected beams, a plurality of flexible tension members individually having draft connection to corresponding ends of the beams, said flexible tension members converging at a position sidewardly and endwardly of the aligned beams, means for connecting the converged flexible tension members to a draft appliance, said flexible tension members being of graduated length whereby the substantially aligned beams are angularly disposed to the normal direction of movement of the draft appliance and each beam caused to have relatively forward and rearward end portions by their angular disposition; a guide arm rigidly mounted on the draft appliance and laterally extended therefrom to the side thereof toward which the aligned beams are forwardly directed, a flexible tension guide connected to the guide arm and the forward end portion of the forwardmost beam; means pivotally and individually interconnecting the forward end portions of the implements to the foward end portions of the beams; and individual implement guides interconnecting the side of the implements to the rearward end portions of their respective beams.

4. In a draft hitch interconnecting a plurality of plows in echelon arrangement and a draft appliance, which hitch includes a plurality of endwardly aligned pivotally interconnected beams angularly disposed to the normal direction of movement of the draft appliance whereby each of the beams has relative forward and rearward end portions, means individually connecting the plows to the beams, and a plurality of cables of progressive length connected to the rearward end portion of each of the beams and to the draft appliance; the combination of a rigid guide arm laterally extended from the draft appliance to the side thereof toward which the aligned beams are forwardly directed; and a flexible tension member interconnecting the laterally extended guide arm and the forward end portion of the forwardmost beam.

5. In combination with a plurality of plows arranged in echelon for earth-traversing movement so that their individual swaths of earth engagement form a continuous broad swath substantially equal to their combined widths, beams individual to the plows endwardly aligned forwardly of the plows and substantially equally spaced from the plows, each of the beams having relative forward and rearward end portions, the individual plows having draft hitches pivotally connected to the forward end portions of their respective beams, brackets pivotally mounted on all of the individual plows except the rearwardmost thereof adjacent to the rearward end portions of their respective beams and pivotally connected thereto, a plurality of cables of progressively rearwardly increased length connected to the rearward end portions of the beams and forwardly converged and connected to a draft appliance forwardly of the beams and to the side thereof opposite to the plows, a guide arm mounted on the draft appliance and laterally extended therefrom to the side of the appliance toward which the aligned beams are directed, and a cable interconnecting the forward end portion of the forward beam with the laterally extended end portion of the guide arm.

FRANCIS A. D'ARTENAY.

REFERENCES CITED

The following references are of record in the file of this patent:

UNITED STATES PATENTS

| Number | Name | Date |
| --- | --- | --- |
| 1,068,570 | Danielson | July 29, 1913 |
| 1,363,507 | Gruwell | Dec. 28, 1920 |
| 2,006,547 | Goble | July 2, 1935 |